July 18, 1961

C. D. HAYHOW 2,992,500

SELF-ERECTING DISPLAY MOUNT

Filed Nov. 20, 1959

INVENTOR.
CYRIL D. HAYHOW
BY
ATTORNEY

July 18, 1961  C. D. HAYHOW  2,992,500
SELF-ERECTING DISPLAY MOUNT

Filed Nov. 20, 1959  2 Sheets-Sheet 2

INVENTOR.
CYRIL D. HAYHOW
BY
ATTORNEY

United States Patent Office 2,992,500
Patented July 18, 1961

2,992,500
SELF-ERECTING DISPLAY MOUNT
Cyril D. Hayhow, Raynham, Mass., assignor to Ad-A-Day Company, Inc., Taunton, Mass., a corporation of Massachusetts
Filed Nov. 20, 1959, Ser. No. 854,278
4 Claims. (Cl. 40—120)

This invention relates to a display mount. In its particular aspect, the invention relates to a collapsible display mount which is so constructed as to permit easy and positive erection thereof.

It is, therefore, an object of the invention to provide a display mount having a display material supporting surface, a head panel connected thereto, and a mount supporting structure, all of which are erectable from a folded position by simple relative rotation of the head panel in respect to the display material supporting surface.

It is a further object of the invention to provide a display mount structure having a face panel adapted to support sheet-like materials, such as calendar pads, memorandum pads and the like, in accessible position, and to provide also an auxiliary panel so attached to the face panel that it will occupy a permanent position which adapts the same to the conveyance of advertising messages when the mount is erected into display position.

The objectives of the invention are attained in a structure which embodies a face panel and a head panel hinged to one edge of the face panel, the head panel having an upwardly extending portion above its hinge and a downwardly extending portion below its hinge at the back of the face panel. The face panel is designed to support display material while the head panel comprises a vehicle for an advertising message. The downwardly extending portion of the head panel performs an important function in the operation of the mount. Accordingly, a pair of mount supporting wings are hinged for rotation at the back of the face panel and normally overlie the downwardly extending portion of the head panel whereby outward rotation of the head panel, the downwardly extending portion thereof will rotate the supporting wings outwardly into mount supporting position.

It is a still further object of the invention to provide a display mount of the class described which is self-locking as the elements thereof are moved from their folded to their erected display position, such that the display supporting surface, the head panel and the supporting wings are held against rotation and the mount as a holder provides a rigid supporting unit.

These and other objects and advantages of the invention will be made clear in the specific description of an embodiment thereof which is illustrated in the drawings, in which drawings like reference numerals indicate like parts, and in which.

Figure 5:
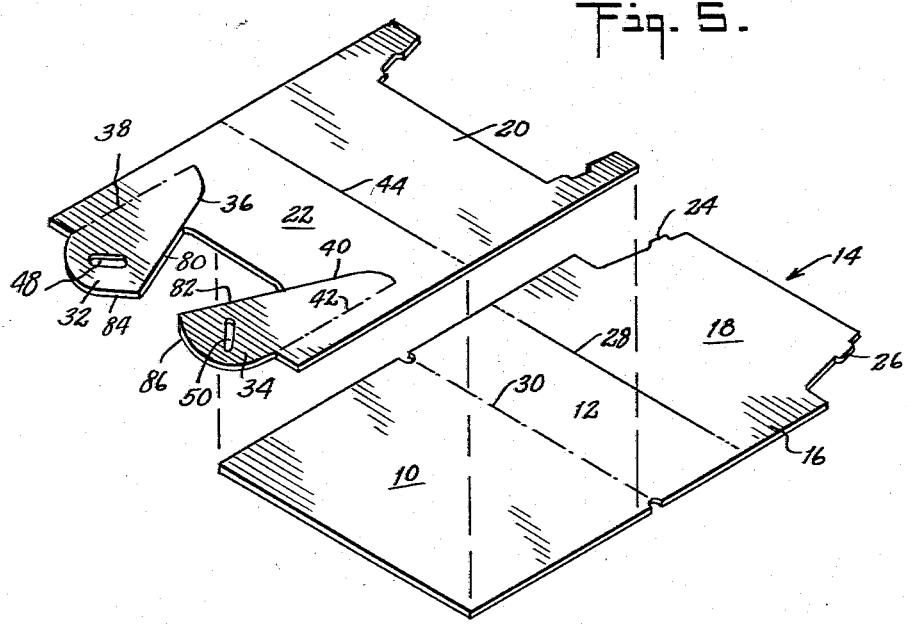
FIG. 5 is an exploded view of a pair of blanks constituting the support structure of the mount.
Figure 6:
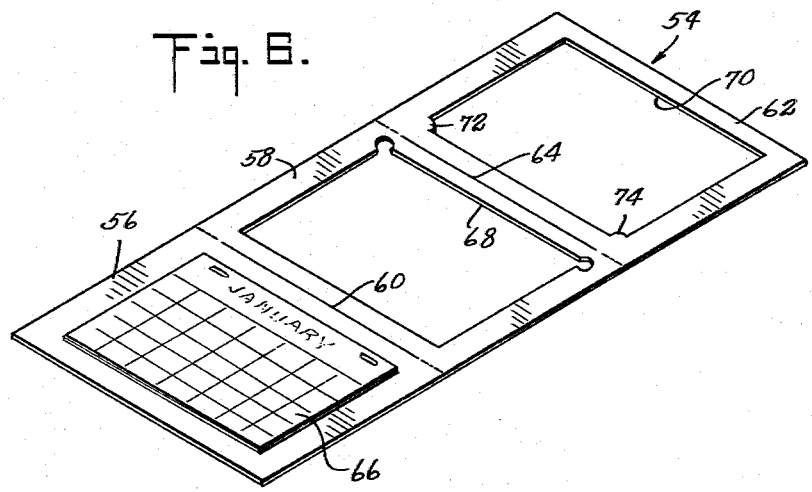
FIG. 6 is a perspective of a blank constituting the elements of a calendar well flap.

The constituent parts of the mount are best illustrated in FIGS. 5 and 6. FIG. 5 shows a pair of blank elements which form the support structure of the mount and by reference to that figure, it can be seen that one blank element includes a face panel 10, a head panel 12 and a latch panel 14 which includes a head panel backing section 16 and a latch section 18, and that the second blank element includes an intermediate panel 20 and a back panel 22. By comparing the configuration of the free end of the intermediate panel 20 with the latch section 18 of the latch panel 14, it can be seen that they are substantial complements of each other such that both elements of the blank can be conveniently formed in one cutting operation performed on a single piece of material such as cardboard or paperboard of fairly rigid character.

The lateral edges of the latch section 18 of the latch panel 14 have formed therein a pair of outwardly extending latching tongues 24 and 26 and the latch panel 14, including the head panel backing section 16 of the latch panel 14, is adapted to be turned inwardly on a transverse hinge line 28 such that the head panel backing section 16 overlies the head panel 12 and such that the latch section 18 extends beyond a second transverse hinge line 30 which separates the head panel 12 from the face panel 10; the length of the latch panel being such that the latch section 18 thereof overlies a portion of the face panel 10 when the latch panel is rotated on the fold line 28.

The back panel 22 has formed therein a pair of mount supporting wings 32 and 34. These wings are of identical formation, each being adapted to swing outwardly into mount supporting position on a hinge line at which it is connected to the back panel. Thus, the wing 32 is severed from the back panel 22 by an incision 36 which extends downwardly into the back panel and intersects a hinge line 38 which is disposed in parallel to the outer edge of the back panel. Similarly, the wing 34 is severed from the back panel by an incision 40 which extends inwardly into the back panel and intersects a hinge line 42 which is parallel to the adjacent edge of the back panel. The blanked out elements, as described, are superimposed by registering the intermediate panel 20 into face-to-face contact with the face panel 10 such that a transverse hinge line 44 which separates the intermediate panel 20 from the back panel 22 coincides with the free edge of the face panel 10. Thereafter, the latch panel 14 is turned inwardly about the hinge line 28 such that the head panel backing section 16 of the latch panel overlies the head panel 12. In this position, the latch section 18 of the latch panel 14 will register with the cut out free end of the intermediate panel 20.

Finally, the back panel 22 is rotated inwardly about the hinge line 44 such that the back panel overlies the intermediate panel 20 and the wings 32 and 34 extend over the latch section 18 of the latch panel 14.

Figure 2:
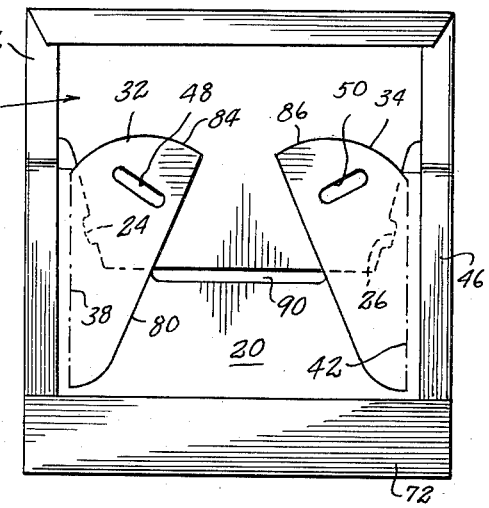
FIG. 2 is a rear view of the folded mount.

When the blank sections are superimposed as described, the marginal edges of the assembly are secured to each other by means of an adhesively attached binding material 46 which extends about the edges of the assembly. In a preferred form, this binding material will extend over the entire face of the assembly and the marginal edges thereof will be adhesively attached to the rear of the assembly as shown in FIG. 2. As shown in FIG. 2, the binding material 46 which is turned about the edges of the assembly and which is secured to the rear face thereof will not interfere with the free movement of the wings 32 and 34 by reason of the fact that this binding terminates short of the wings at either side of the support structure, it being noted in FIG. 2 that the hinge lines 38 and 42 are spaced inwardly from the terminal edge of the binding material 46.

The binding material 46 serves to secure together the head panel 12 and the head panel backing section 16 of the latch panel 14. Yet the binding material does not contact the latch section 18 of the latch panel 14 such that the latch section 18 is in effect separate, thus permitting the head panel 12 and the latch panel 14 to rotate as a unit about the hinge line 30.

Since the latch section 18 and the latch panel 14 underlie the wings 32 and 34, rotary movement of the head panel 12 about the hinge line 30 will result in the outward movement of the latch section 18 of the latch panel 14 such that the latch tongues 24 and 26 formed in the opposite lateral edges of the latch section 18 will respectively engage latch slots 48 and 50 formed in the free ends of the wings 32 and 34, respectively. When so rotated, the head panel 12 will be disposed at an angle to the supporting base which consists of the face panel 10, the intermediate panel 20 and the back panel 22. The erected position attained upon such rotation is that shown in FIGS. 3 and 4.

The mount as described, provides a supporting base 52 for the display of appropriate material. The head panel 12 is angularly erected into a position which will catch the eye when the mount is erected and supported on a desk or the like. Consequently, the head panel 12 is admirably used as an advertising vehicle.

Figure 3:
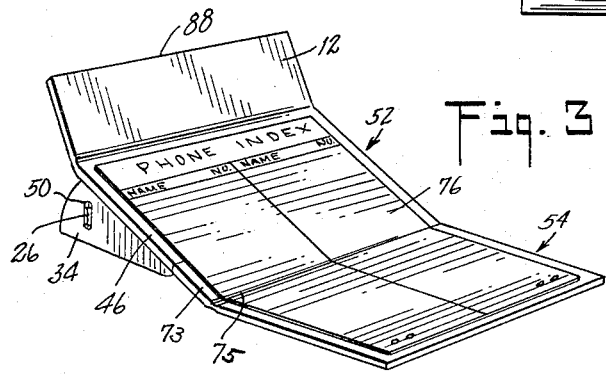
FIG. 3 is an oblique perspective of the mount in erected position.
Figure 4:
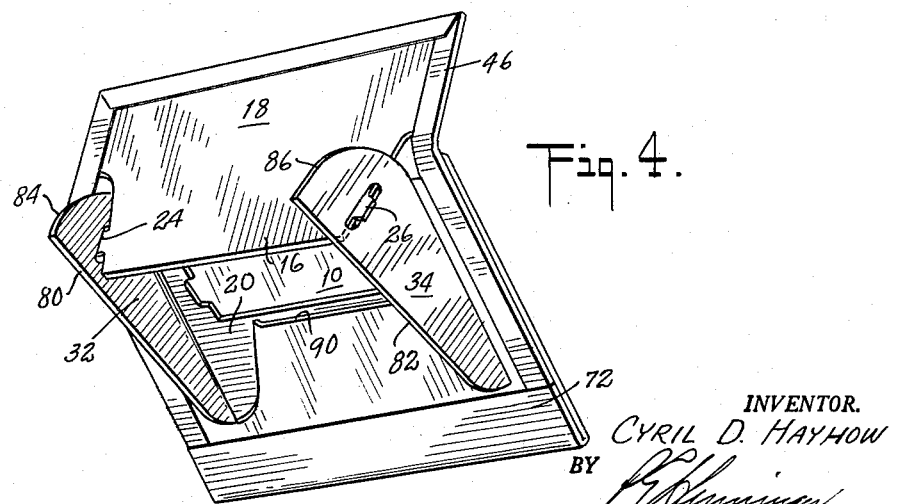
FIG. 4 is an oblique perspective of the back and bottom of the mount in erected position.

In a preferred form of the invention, the supporting base 52 has formed as a part thereof, or has attached thereto, a calendar well flap 54 as shown in FIG. 3. The calendar well flap 54 is conveniently formed of a blank such as shown in FIG. 6.

The calendar well flap 54 of FIG. 6 is composed of three substantially equal sections. As shown, the calendar well flap is substantially rectangular and is divided into a base board 56 and a well board 58 by means of a transverse hinge line 60. The well board 58 is further divided from a face board 62 by a transverse hinge line 64 which is parallel to the first named hinge line 60. The hinge lines 60 and 64 divide the calendar well flap panel into three substantially equal sections. The base board 56 is designed to support a month-to-month calendar pad 66 or a similar substantially flat display object. The well board 58 has formed therein a substantially rectangular display embracing well 68 which is preferably of a size and outline to closely embrace the marginal edges of the display object to be carried by the base board 56. In the case of the illustration of FIG. 6, the base board 56 has a generally rectangular pad of sheets constituting a calendar pad 66. In such case, the well 68 within the well board 58 will be only slightly larger than the corresponding margins of the calendar pad 66.

The face board 62 will have a display window cut out 70 formed therein which cut out is substantially the same shape and size as the display well 68. In this case, the display well 68 in the well board 58, and the display window 70 in the face board 62 may be formed according to the method disclosed in United States Patent 2,355,706, issued to C. N. Cross on August 15, 1944, whereby a pair of corner overhangs 72 and 74 will be formed in the display window 70. In the latter case, the remaining margins of the display window 70 may coincide with those of the well 68 and consequently with the display material on the base board 56. Unless corner pockets are formed by resort to the display corner overhangs 72 and 74, it would be appropriate to form the display window 70 on somewhat smaller dimensions at least in one direction, than the dimensions of the display material thereby providing marginal overlays for the display material such that the material is supported in the well by contact of the face board along one or more edges thereof.

The calendar well flap 54 is folded by folding the well board 58 into face-to-face contact with the base board 56. The hinge line 60 is provided to permit such folding action. The face board 62 is then folded into face-to-face contact with the exposed side of the well board 58 by rotating the face board about the hinge line 64. When so folded, the calendar well flap may be bound into a unit by resort to a binding operation such as that described above in respect to the binding used on the support structure assembly.

Figure 1:
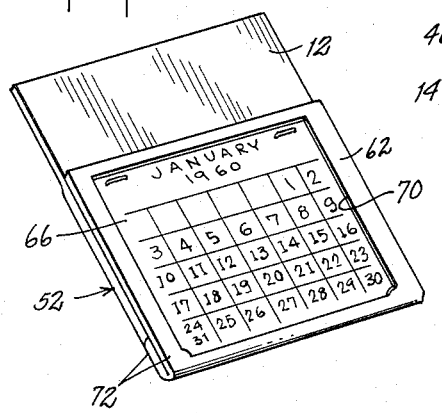
FIG. 1 is a facial perspective view of a mount comprising the invention, the mount being in its collapsible or folded position.

If the calendar well flap 54 is formed according to the method described in the aforesaid patent, the display material well 68 will be completed when the display window 70 is cut into the flap. Under such conditions, the structure can be folded as described above and after folding, it can be bound over the face thereof with facial lining material extending about the edges of the assembly and terminating on the back, as described in connection with the lining material 46 applied to the support structure assembly. Conventionally, the same lining operation can be utilized to attach the calendar well flap 54 to the supporting base 52. In such case, a lining material 73 applied to the calendar well flap assembly may also be extended over and applied to the free end of the supporting base assembly 52, as shown in FIG. 3. A hinge 75 composed of the flexible, decorative lining material will permit the calendar well flap 54 to rotate in respect to the supporting base 52 from the position shown in FIG. 1 to that shown in FIG. 3 and vice versa.

The inclusion of the calendar well flap structure adds utility to the mount in that it provides on one face of the calendar well flap 54 a mounting and display means for a display object such as a calendar, as hereinabove described, and further a display surface 76 for the receipt of telephone numbers, anniversary dates and the like, as shown in FIG. 3.

The liner 76 not only serves the stated utilitarian function, but it also adds to the artistic appearance of the finished product by reason of the fact that the terminal edges of the flexible binding materials 46 and 73 are completely covered.

The wings 32 and 34 are formed with two supporting edges. The edges 80 and 82 of the wings 32 and 34, respectively, will support the mount in the position shown in FIG. 3 when the wings are rotated outwardly into supporting position. Alternately, the surfaces 84 and 86, respectively, of the wings 32 and 34 may be used as the mount supporting surfaces thereof. When so employed, these surfaces in conjunction with the free edge 88 of the head panel 12 will support the supporting base 52 of the mount in a more or less upright position.

The junction of the latch section 18 and the intermediate panel 20, as shown in FIG. 2, may be formed with a cut out 90 to facilitate grasp of the free edge of the latch section 18. In FIG. 2, the cut out 90 is formed in the intermediate panel 20. It is obvious, however, that the same may be formed in the latch section 18 with equally satisfactory results.

To erect the mount, it is only necessary to grasp the free edge of the latch section 18 in the area of the cut out 90, or the head panel itself, and rotate the entire latch panel 14 such that the latch panel and the head panel 12 are rotated about the hinge line 30 which connects the head panel 12 to the face panel 10. Since the supporting wings 32 and 34 overlie the latch section 18, rotative movement of the latch section 18 will serve to cam the supporting wings 32 and 34 outwardly about their respective hinge lines 38 and 42. Continued rotation of the latch panel 14 will bring the latching tongues 24 and 26 into registration with the respective latch slots 48 and 50 such that the latching tongues are engaged in their related latch slots. Rotation of the supporting wings 32 and 34 about their respective hinge lines 38 and 42 meets with sufficient resistance that the supporting wings always tend to move toward their collapsed position within the plane of the back panel 22 with the result that when the latching tongues 24 and 26 are in registration with the latch slots 48 and 50, respectively, the interengagement of tongue and slot is a positive one as attested by the audible click when interengagement takes place. By the same token, to release the supporting wings 32 and 34 they are moved outwardly manually from the influence of the latching tongues and when the latching tongues are disengaged from their respective latch slots, the head panel 12 and the latch panel 18 will automatically return to the collapsed position by reason of the tension of the hinge line 30 against which the elements were erected. The supporting wings 32 and 34 will also return to a flat position overlying the latch section 18.

While certain fabricating steps have been referred to hereinabove, it is not to be implied that the invention is dependent on either the specific fabricating steps described, or other sequence. For example, the foregoing description conveys the implication that the calendar pad 66 is stapled against the base board 56 at some early step of the fabricating process when, in fact, the insertion of the calendar pad and the stapling thereof may be one of the final steps of the fabricating operation. By the same token, the binding and lining process has been described only insofar as its utility in the present structure is involved. Consequently, the specific nature of the binding and lining operation, if a binding and lining operation is employed at all, may be so performed to best suit the fabricating process which is adopted, and to obtain the most pleasing visual result.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

I claim:

1. In a display mount, a face panel, a head panel hinged at one edge of said face panel, said head panel having a portion extending outwardly of said edge and an integral portion extending inwardly of said edge whereby said outwardly extending portion is disposed forwardly of the plane of said face panel and said inwardly extending portion is disposed rearwardly of the plane of said face panel when said head panel is rotated about its hinge, and a pair of mount supporting wings hinged for rotation at the back of said face panel and being normally disposed in a common plane overlying said inwardly extending portion of said head panel whereby rearward rotation of said inwardly extending portion of said head panel will rotate said supporting wings into mount supporting position upon rotation of said head panel about its hinge.

2. The invention of claim 1, including inter-engaging surfaces on said inwardly extending portion of said head panel and said wings for latching said wings when the same are rotated into mount supporting position.

3. The invention of claim 1, in which said face panel is generally rectangular in shape and said wings are hinged for rotation along parallel lines at the lateral edges of said panel.

4. The invention of claim 1, in which each of said wings has a latch slot therein and said inwardly extending portion has a pair of locking tongues adapted to engage in said slots.

References Cited in the file of this patent

UNITED STATES PATENTS

| | | |
|---|---|---|
| 2,115,243 | Schmidt | Apr. 26, 1938 |
| 2,902,785 | Nichols | Sept. 8, 1959 |